(12) United States Patent
Motwani

(10) Patent No.: US 7,733,590 B2
(45) Date of Patent: Jun. 8, 2010

(54) OPTIMAL SYNCHRONIZATION MARK/ADDRESS MARK CONSTRUCTION

(75) Inventor: Ravi Motwani, Longmont, CO (US)

(73) Assignee: Broadcom Corporation, Irvine, CA (US)

(*) Notice: Subject to any disclaimer, the term of this patent is extended or adjusted under 35 U.S.C. 154(b) by 559 days.

(21) Appl. No.: 11/472,258

(22) Filed: Jun. 21, 2006

(65) Prior Publication Data
US 2007/0297079 A1    Dec. 27, 2007

(51) Int. Cl.
*G11B 5/09* (2006.01)
*G11B 27/19* (2006.01)

(52) U.S. Cl. .................. 360/51; G9B/27.025

(58) Field of Classification Search ............ None
See application file for complete search history.

(56) References Cited

U.S. PATENT DOCUMENTS 7,403,351 B1 * 7/2008 Han et al. ............... 360/46

* cited by examiner

*Primary Examiner*—Daniell L Negrón
(74) *Attorney, Agent, or Firm*—Garlick Harrison & Markison; Shayne X. Short (57) ABSTRACT

Optimal synchronization mark/address mark construction. These marks can generally be referred to as sync marks. A novel means is presented by which sync marks can be generated for use within a variety of communication systems including HDD systems. The sync marks generated hereby have a largest possible minimum distance measurement that ensures highly accurate detection of the transition between the data portion and the preamble portion of information that is processed. Various types of distance measurement criteria can be employed, including a Euclidean distance measurement or a Hamming distance measurement, when selecting the sync mark from among a plurality of possible sync marks.

20 Claims, 9 Drawing Sheets

OPTIMAL SYNCHRONIZATION MARK/ADDRESS MARK CONSTRUCTION

BACKGROUND OF THE INVENTION

1. Technical Field of the Invention

The invention relates generally to hard disk drives (HDDs); and, more particularly, it relates to synchronization that includes indicating the data portions within signals employed within such HDDs.

2. Description of Related Art

As is known, many varieties of memory storage devices (e.g. disk drives), such as magnetic disk drives are used to provide data storage for a host device, either directly, or through a network such as a storage area network (SAN) or network attached storage (NAS). Typical host devices include stand alone computer systems such as a desktop or laptop computer, enterprise storage devices such as servers, storage arrays such as a redundant array of independent disks (RAID) arrays, storage routers, storage switches and storage directors, and other consumer devices such as video game systems and digital video recorders. These devices provide high storage capacity in a cost effective manner.

When processing information that is read from (or that will be written to) a storage media of a HDD, oftentimes there is an indication provided within the portion of information to indicate a transition between a preamble portion and a data portion. The preamble and the data portion are sometimes given other names in the art (e.g., the data portion can be referred to as payload). This indication can be referred to as a sync mark, sometimes referred to as a synchronization mark or an address mark, which allows a device to know where the data portion begins and where the preamble portion ends when processing information.

There is a need in the art for a better means by which sync marks (e.g. synchronization marks/address marks) may be identified and constructed for use within HDDs.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
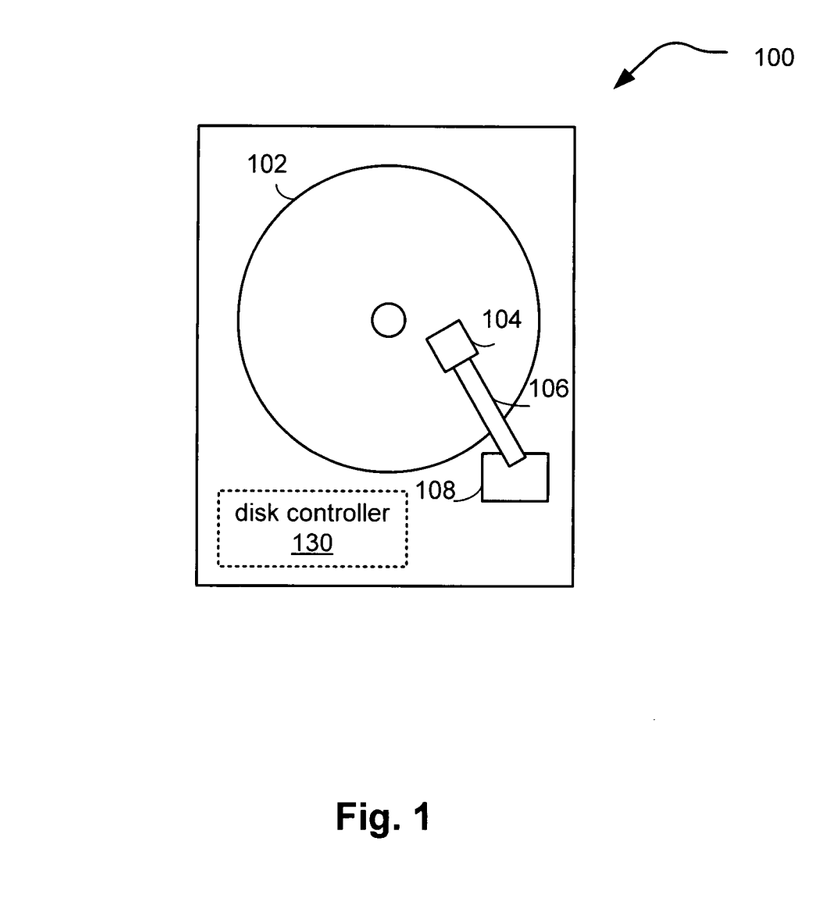
FIG. 1 illustrates an embodiment of a disk drive unit.

FIG. 1 illustrates an embodiment of a disk drive unit 100. In particular, disk drive unit 100 includes a disk 102 that is rotated by a servo motor (not specifically shown) at a velocity such as 3600 revolutions per minute (RPM), 4200 RPM, 4800 RPM, 5,400 RPM, 7,200 RPM, 10,000 RPM, 15,000 RPM, however, other velocities including greater or lesser velocities may likewise be used, depending on the particular application and implementation in a host device. In one possible embodiment, disk 102 can be a magnetic disk that stores information as magnetic field changes on some type of magnetic medium. The medium can be a rigid or non-rigid, removable or non-removable, that consists of or is coated with magnetic material.

Disk drive unit 100 further includes one or more read/write heads 104 that are coupled to arm 106 that is moved by actuator 108 over the surface of the disk 102 either by translation, rotation or both. A disk controller 130 is included for controlling the read and write operations to and from the drive, for controlling the speed of the servo motor and the motion of actuator 108, and for providing an interface to and from the host device.

Figure 2:
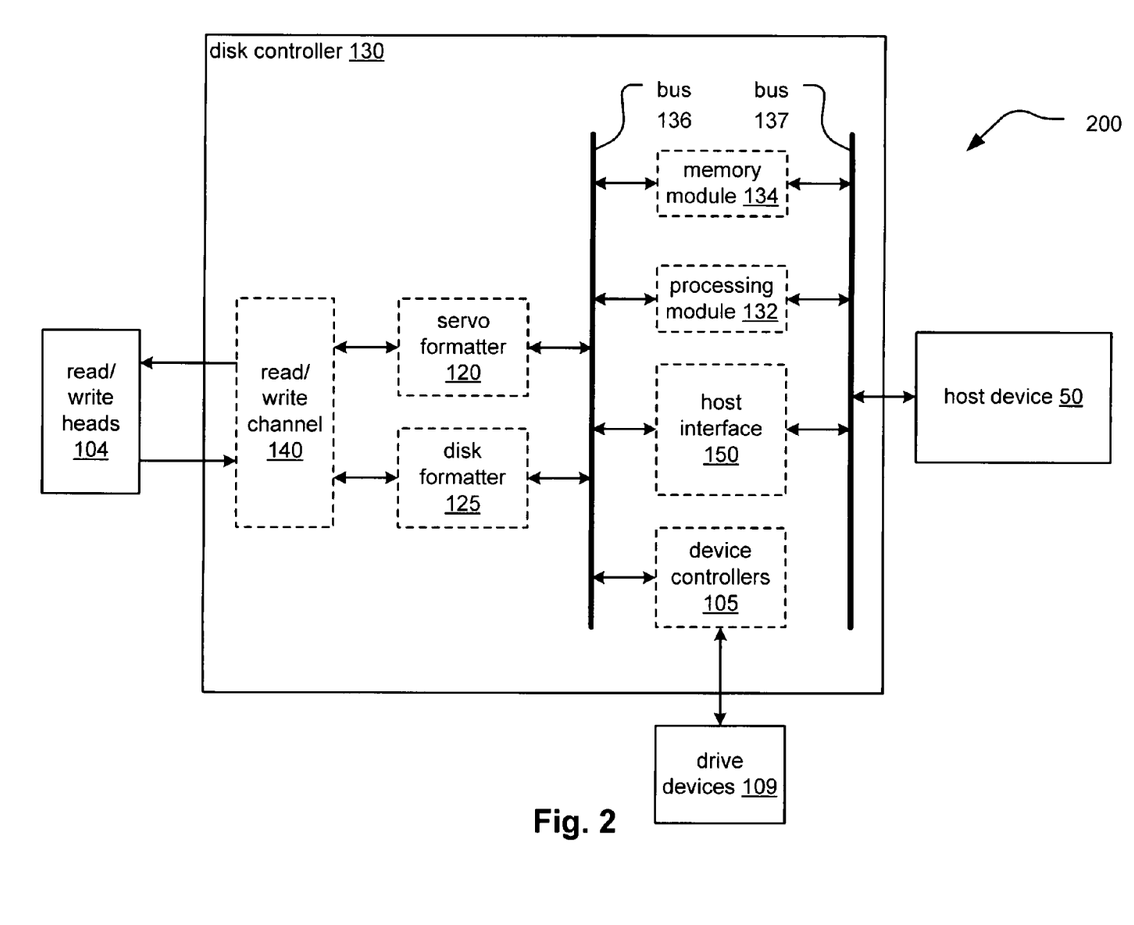
FIG. 2 illustrates an embodiment of an apparatus that includes a disk controller.

FIG. 2 illustrates an embodiment of an apparatus 200 that includes a disk controller 130. In particular, disk controller 130 includes a read/write channel 140 for reading and writing data to and from disk 102 through read/write heads 104. Disk formatter 125 is included for controlling the formatting of data and provides clock signals and other timing signals that control the flow of the data written to, and data read from disk 102. Servo formatter 120 provides clock signals and other timing signals based on servo control data read from disk 102. Device controllers 105 control the operation of drive devices 109 such as actuator 108 and the servo motor, etc. Host interface 150 receives read and write commands from host device 50 and transmits data read from disk 102 along with other control information in accordance with a host interface protocol. In one embodiment, the host interface protocol can include, SCSI, SATA, enhanced integrated drive electronics (EIDE), or any number of other host interface protocols, either open or proprietary that can be used for this purpose.

Disk controller 130 further includes a processing module 132 and memory module 134. Processing module 132 can be implemented using one or more microprocessors, micro-controllers, digital signal processors, microcomputers, central processing units, field programmable gate arrays, programmable logic devices, state machines, logic circuits, analog circuits, digital circuits, and/or any devices that manipulates signal (analog and/or digital) based on operational instructions that are stored in memory module 134. When processing module 132 is implemented with two or more devices, each device can perform the same steps, processes or functions in order to provide fault tolerance or redundancy. Alternatively, the function, steps and processes performed by processing module 132 can be split between different devices to provide greater computational speed and/or efficiency.

Memory module 134 may be a single memory device or a plurality of memory devices. Such a memory device may be a read-only memory, random access memory, volatile memory, non-volatile memory, static random access memory (SRAM), dynamic random access memory (DRAM), flash memory, cache memory, and/or any device that stores digital information. Note that when the processing module 132 implements one or more of its functions via a state machine, analog circuitry, digital circuitry, and/or logic circuitry, the memory module 134 storing the corresponding operational instructions may be embedded within, or external to, the circuitry comprising the state machine, analog circuitry, digital circuitry, and/or logic circuitry. Further note that, the memory module 134 stores, and the processing module 132 executes, operational instructions that can correspond to one or more of the steps or a process, method and/or function illustrated herein.

Disk controller 130 includes a plurality of modules, in particular, device controllers 105, processing module 132, memory module 134, read/write channel 140, disk formatter 125, servo formatter 120 and host interface 150 that are interconnected via bus 136 and bus 137. Each of these modules can be implemented in hardware, firmware, software or a combination thereof, in accordance with the broad scope of the present invention. While a particular bus architecture is shown in FIG. 2 with buses 136 and 137, alternative bus architectures that include either a single bus configuration or additional data buses, further connectivity, such as direct connectivity between the various modules, are likewise possible to implement the features and functions included in various embodiments.

In one possible embodiment, one or more modules of disk controller 130 are implemented as part of a system on a chip (SoC) integrated circuit. In an embodiment, this SoC integrated circuit includes a digital portion that can include additional modules such as protocol converters, linear block code encoding and decoding modules, etc., and an analog portion that includes device controllers 105 and optionally additional modules, such as a power supply, etc. In a further embodiment, the various functions and features of disk controller 130 are implemented in a plurality of integrated circuit devices that communicate and combine to perform the functionality of disk controller 130.

When the drive unit 100 is manufactured, disk formatter 125 writes a plurality of servo wedges along with a corresponding plurality of servo address marks at equal radial distance along the disk 102. The servo address marks are used by the timing generator for triggering the "start time" for various events employed when accessing the media of the disk 102 through read/write heads 104.

Figure 3A:
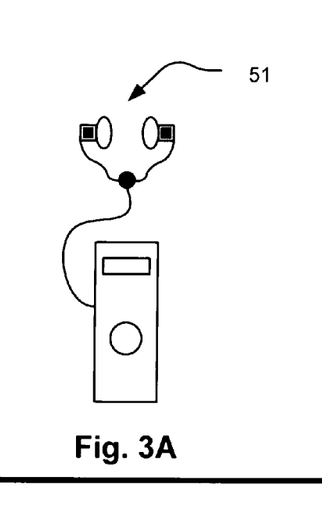
FIG. 3A illustrates an embodiment of a handheld audio unit.

FIG. 3A illustrates an embodiment of a handheld audio unit 51. In particular, disk drive unit 100 can be implemented in the handheld audio unit 51. In one possible embodiment, the disk drive unit 100 can include a small form factor magnetic hard disk whose disk 102 has a diameter 1.8" or smaller that is incorporated into or otherwise used by handheld audio unit 51 to provide general storage or storage of audio content such as motion picture expert group (MPEG) audio layer 3 (MP3) files or Windows Media Architecture (WMA) files, video content such as MPEG4 files for playback to a user, and/or any other type of information that may be stored in a digital format.

Figure 3B:
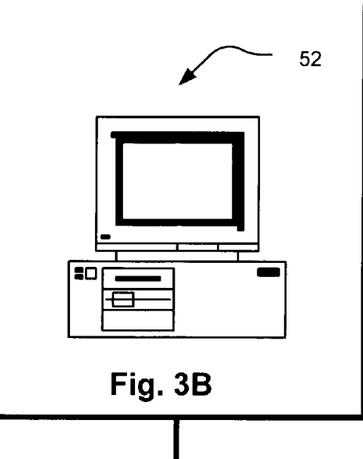
FIG. 3B illustrates an embodiment of a computer.

FIG. 3B illustrates an embodiment of a computer 52. In particular, disk drive unit 100 can be implemented in the computer 52. In one possible embodiment, disk drive unit 100 can include a small form factor magnetic hard disk whose disk 102 has a diameter 1.8" or smaller, a 2.5" or 3.5" drive or larger drive for applications such as enterprise storage applications. Disk drive 100 is incorporated into or otherwise used by computer 52 to provide general purpose storage for any type of information in digital format. Computer 52 can be a desktop computer, or an enterprise storage devices such a server, of a host computer that is attached to a storage array such as a redundant array of independent disks (RAID) array, storage router, edge router, storage switch and/or storage director.

Figure 3C:
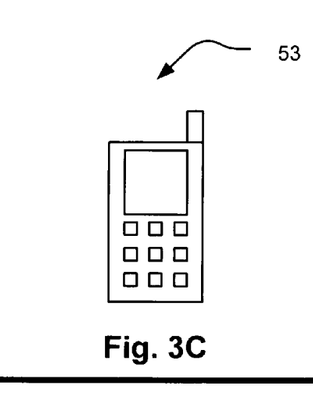
FIG. 3C illustrates an embodiment of a wireless communication device.

FIG. 3C illustrates an embodiment of a wireless communication device 53. In particular, disk drive unit 100 can be implemented in the wireless communication device 53. In one possible embodiment, disk drive unit 100 can include a small form factor magnetic hard disk whose disk 102 has a diameter 1.8" or smaller that is incorporated into or otherwise used by wireless communication device 53 to provide general storage or storage of audio content such as motion picture expert group (MPEG) audio layer 3 (MP3) files or Windows Media Architecture (WMA) files, video content such as MPEG4 files, JPEG (joint photographic expert group) files, bitmap files and files stored in other graphics formats that may be captured by an integrated camera or downloaded to the wireless communication device 53, emails, webpage information and other information downloaded from the Internet, address book information, and/or any other type of information that may be stored in a digital format.

In a possible embodiment, wireless communication device 53 is capable of communicating via a wireless telephone network such as a cellular, personal communications service (PCS), general packet radio service (GPRS), global system for mobile communications (GSM), and integrated digital enhanced network (iDEN) or other wireless communications network capable of sending and receiving telephone calls. Further, wireless communication device 53 is capable of communicating via the Internet to access email, download content, access websites, and provide steaming audio and/or video programming. In this fashion, wireless communication device 53 can place and receive telephone calls, text messages such as emails, short message service (SMS) messages, pages and other data messages that can include attachments such as documents, audio files, video files, images and other graphics.

Figure 3D:
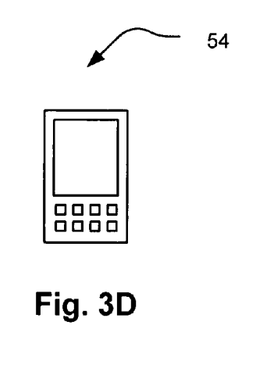
FIG. 3D illustrates an embodiment of a personal digital assistant (PDA).

FIG. 3D illustrates an embodiment of a personal digital assistant (PDA) 54. In particular, disk drive unit 100 can be implemented in the personal digital assistant (PDA) 54. In one possible embodiment, disk drive unit 100 can include a small form factor magnetic hard disk whose disk 102 has a diameter 1.8" or smaller that is incorporated into or otherwise used by personal digital assistant 54 to provide general storage or storage of audio content such as motion picture expert group (MPEG) audio layer 3 (MP3) files or Windows Media Architecture (WMA) files, video content such as MPEG4 files, JPEG (joint photographic expert group) files, bitmap files and files stored in other graphics formats, emails, webpage information and other information downloaded from the Internet, address book information, and/or any other type of information that may be stored in a digital format.

Figure 3E:
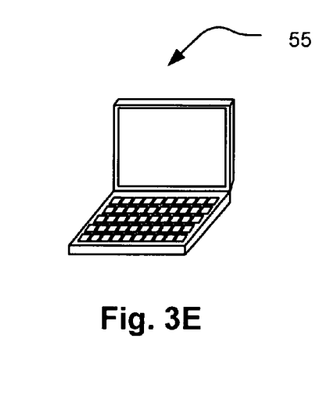
FIG. 3E illustrates an embodiment of a laptop computer.

FIG. 3E illustrates an embodiment of a laptop computer 55. In particular, disk drive unit 100 can be implemented in the laptop computer 55. In one possible embodiment, disk drive unit 100 can include a small form factor magnetic hard disk whose disk 102 has a diameter 1.8" or smaller, or a 2.5" drive. Disk drive 100 is incorporated into or otherwise used by laptop computer 52 to provide general purpose storage for any type of information in digital format.

Figure 4:
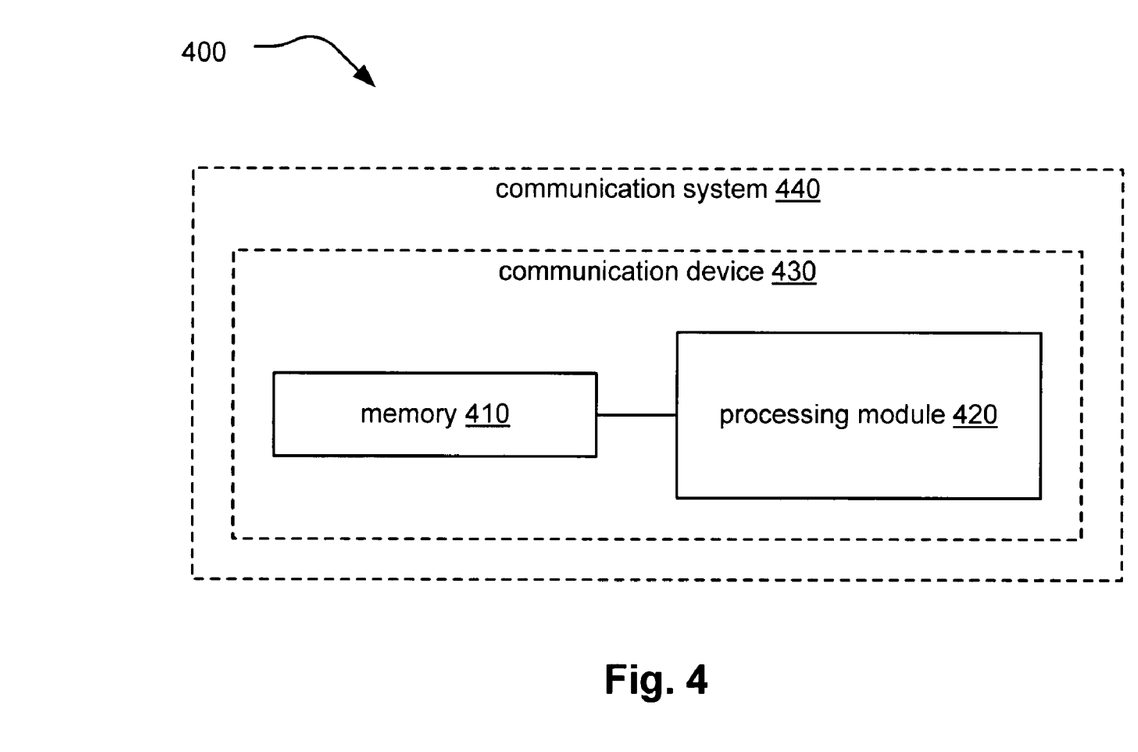
FIG. 4 is a diagram illustrating an embodiment of an apparatus that is operable to construct synchronization mark/address mark (generally referred to as sync mark).

FIG. 4 is a diagram illustrating an embodiment of an apparatus 400 that is operable to construct synchronization mark/address mark (generally referred to as sync mark). The apparatus 400 includes a processing module 420, and a memory

410. The memory 410 is coupled to the processing module, and the memory 410 is operable to store operational instructions that enable the processing module 420 to perform a variety of functions. The processing module 420 (serviced by the memory 420) can be implemented as an apparatus capable to perform any of the functionality of any of the various modules and/or functional blocks described herein. For example, the processing module 420 (serviced by the memory 420) can be implemented as an apparatus capable to perform an optimal means by which a sync mark may be generated for use in a HDD.

The processing module 420 can be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 410 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 420 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

If desired in some embodiments, the apparatus 400 can be any of a variety of communication devices 430, or any part or portion of any such communication device 430. Any such communication device that includes the apparatus 400 can be implemented within any of a variety of communication systems 440 as well.

Within a HDD application context, the read channel (that is the communication channel through which information is written to and read from the storage media of the HDD) can be viewed as having characteristics of an asynchronous communication system, and control signals are therefore required to indicate the beginning of the data within a portion of information that is written to or read from the storage media.

The sync mark pattern is used for this purpose and the end of the sync mark signals the start of the encoded user data. Hence, identification of the sync mark pattern is crucial when processing a portion of information. If the sync mark is not properly detected, then the sector is aborted. It is an even worse scenario if the sync mark is mis-detected because then the user data will be incorrectly detected.

Figure 5:
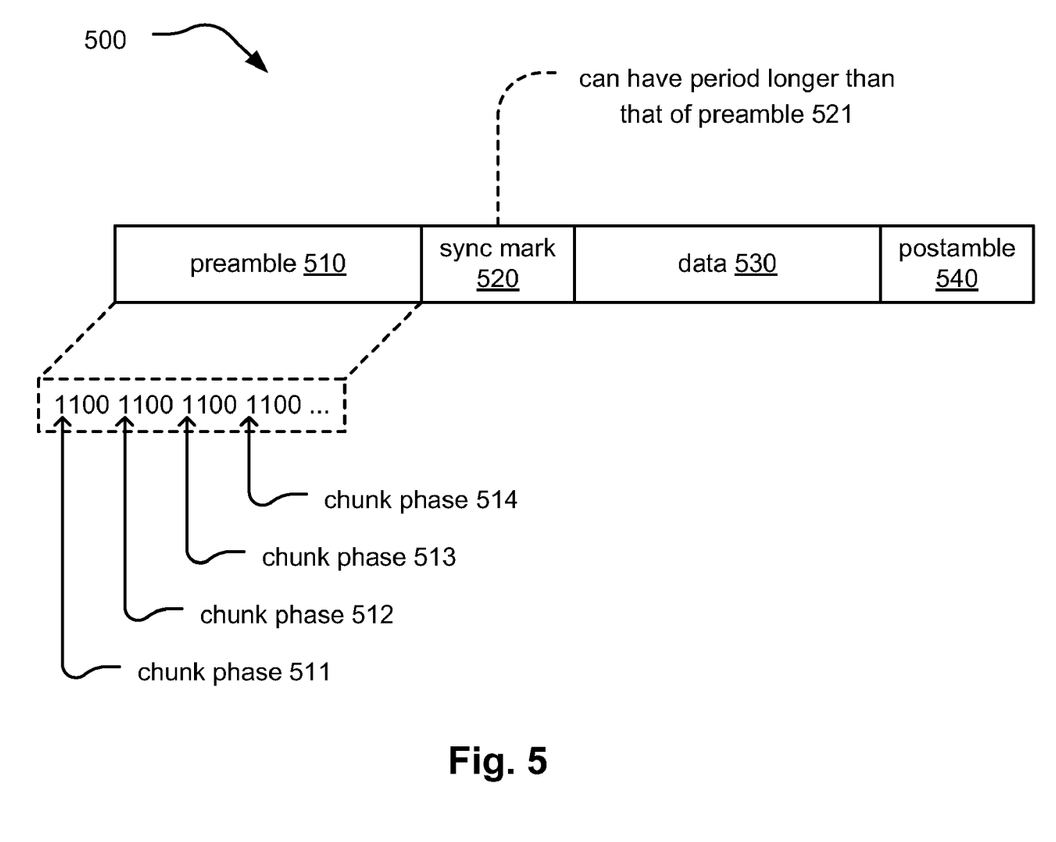
FIG. 5 is a diagram illustrating an embodiment of a packet of information having various portions.

It is noted that the sequence of the data flow is preamble, sync mark, and user encoded data (e.g. data) followed by the postamble; this arrangement is depicted in more detail with respect to FIG. 5. Hence, the search for the sync mark pattern begins during the preamble read and ideally when the sync mark pattern is read, it is detected.

The distance of the sync mark pattern from the preamble pattern and part-preamble-part-sync mark portion of the information should be as large as possible. The distance here refers to a minimum distance measurement, which could be a Euclidean distance or a Hamming distance, among other distance measurement types. For example, when implementing a scheme that considers the sync mark at the output of the Viterbi detector, a Hamming distance measurement could be employed. In such a case, it would then be desirable to construct a sync mark pattern which has a maximal Hamming distance from the preamble pattern and part-preamble-part-sync mark portion. For the Euclidean distance case, when the output of the partial response (PR) channel (e.g., output of a finite impulse response filter (FIR) in some cases), the sync mark patterns would then be considered when looking at the output of the PR channel.

Various approaches are presented herein for selecting a sync mark. Generally speaking, an optimal sync mark is one such that the sequence of the sync mark has the largest distance as compared to any other sync mark pattern. Depending on the particular distance measurement criteria to be employed, the distance could be the Euclidean distance of Hamming distance depending on the probe point within a processing chain (as referred to above and also described in more detail below). For example, the Euclidean distance could be employed when considering the output of the partial response (PR) channel such as the output of a finite impulse response filter (FIR). Alternatively, the Hamming distance can be employed when considering the output of a Viterbi detector within the processing chain.

When considering a finite precision system (i.e., employing a certain number of bits to represent the pattern of the sync mark), the total number of possible sync mark patterns may not be very large, so a computer can be implemented to search for the optimal sync mark pattern. Furthermore, since the construction of these sync mark patterns can be performed offline, the time required to search for the optimal sync mark pattern may not be a critical design constraint. In one possible embodiment presented herein, the procedure for constructing the sync mark pattern is based on the max/min criterion (e.g., a maximum and minimum criterion), where a sync mark pattern is selected, and the minimum distance for that sync mark is computed; this can be viewed as the "min" portion. A pattern which maximizes the minimum distance is then the optimal or selected sync mark pattern; this can be viewed as the "max" portion.

One of the advantages of using the max/min criterion for the design of sync marks is that it leads to robust sync marks. This minimizes the probability of misdetection and also minimizes the probability of false detection. Hence, reliable sync mark detection can be ensured even in extremely noisy conditions. This is desirable for many communication systems including those other than HDD systems.

FIG. 5 is a diagram illustrating an embodiment of a packet 500 of information having various portions. As generally referred to above, an information sequence employed within many communication systems, including HDD systems, can have a flow such as preamble 510, sync mark 520, and user encoded data (e.g. data 530) followed by the postamble 540. When processing the packet 500, it is critical to detect the transition between the preamble 510 and the sync mark 520. This is what makes the construction of the sync mark 520 so critical.

Sometimes, a repeatable pattern is employed within the preamble 510, such as the four bits 1100 repeated a certain number of times. While the four bits 0011 are shown, it is understood that they could correspond to values of 2200 in the magnetic read/write context. The beginning of each of these periods within the preamble 510 is sometimes referred to as a chunk phase in the art. For example, 4 separate chunk phases (depicted using reference numerals 511, 512, 513, and 514) are shown within the preamble 510. The sync mark 520 is a field that can have a period that is longer than the period of the preamble 510, as depicted using reference numeral 521.

Figure 6:
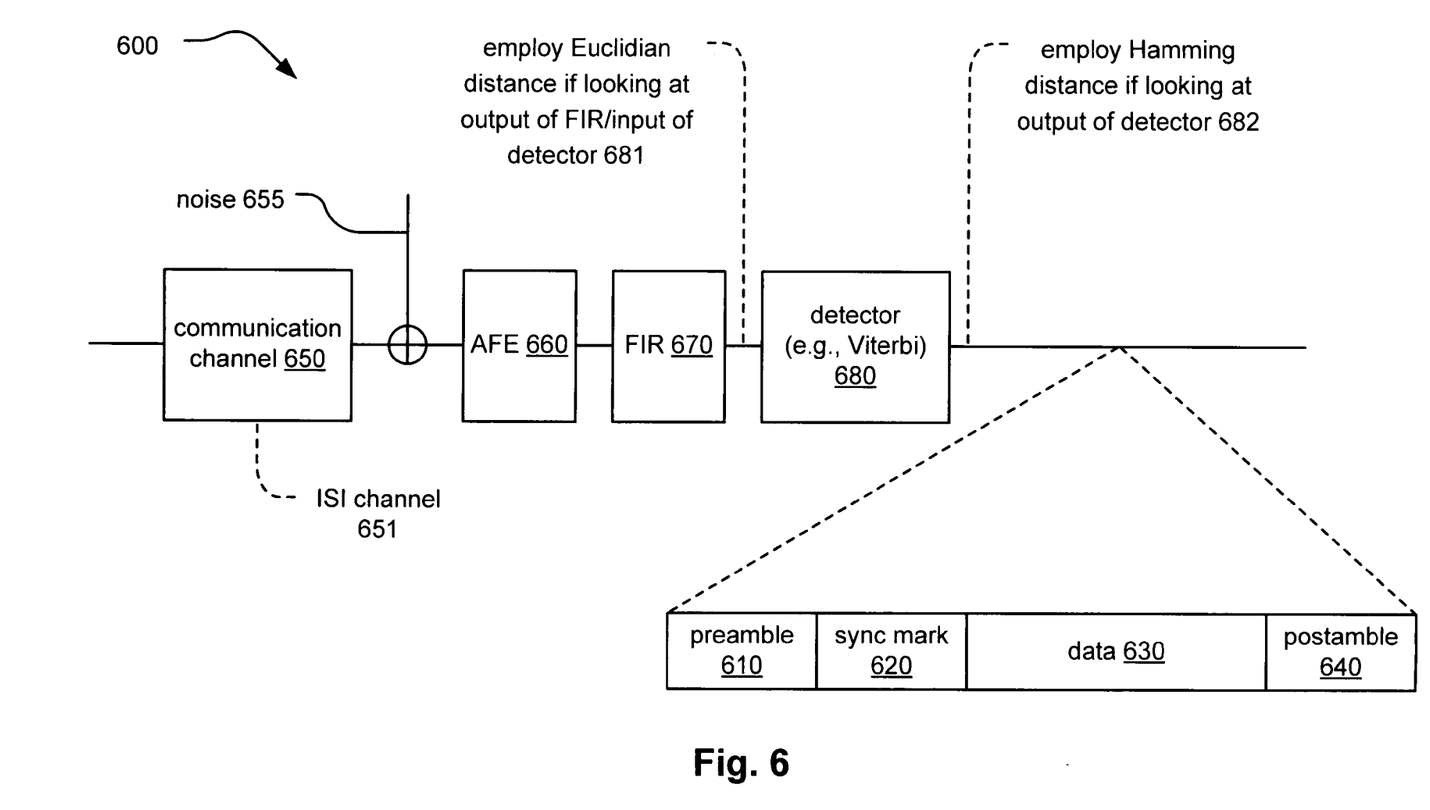
FIG. 6 is a diagram illustrating an embodiment of an apparatus that is operable to process information.

FIG. 6 is a diagram illustrating an embodiment of an apparatus 600 that is operable to process information. The apparatus 600 is at least a portion of a device that is operable to perform the processing of information that is read from a communication channel 650. The communication channel 650 can be an ISI (Inter-Symbol Interference) channel 651 in some embodiments in which the communication channel 650 performs undesirable filtering/shaping of information that is transmitted through it. Noise 655 is shown as being added as well to a signal that is received from the communication channel 650. The signal is then passed to an analog front end (AFE) 660 that is operable to perform any of a variety of analog processing functions including digital to analog conversion, scaling (e.g., gain or attenuation), digital filtering (before converting to continuous time domain), continuous time filtering (after converting to continuous time domain), or other signal processing functions required to comport the signal into or from a format compatible with the communication channel 650. The AFE 660 can also include a preamp that is often implemented as part of a read head assembly in many HDD systems.

This now digital signal is passed from the AFE 660 to a finite impulse response filter (FIR) 670 that is operable to perform certain digital filtering thereon, and the output of the FIR 670 is passed to a detector 680 that is operable to calculate soft information from the signal output from the FIG. 670 for use in performing iterative error correction decoding. In some instances, this detector 680 can be a Viterbi detector.

The signal that is output from the detector 680 ideally includes and properly identifies each of the portions of information including preamble 610, sync mark 620, data 630, and postamble 640 within a packet.

As described above, when constructing the appropriate sync mark for the system, either the input or output of the detector 680 can be considered. For example, the minimum distance measurement which can be employed may be either a Euclidean distance or a Hamming distance, among other distance measurement types. When implementing a scheme to that considers the sync mark at the output of the detector 680, a Hamming distance measurement could be employed, as indicated with reference numeral 682. When implementing a scheme to that considers the sync mark at the input of the detector 680 (or the output of the FIR 670), then a Euclidean distance measurement could be employed, as indicated with reference numeral 681.

Figure 7:
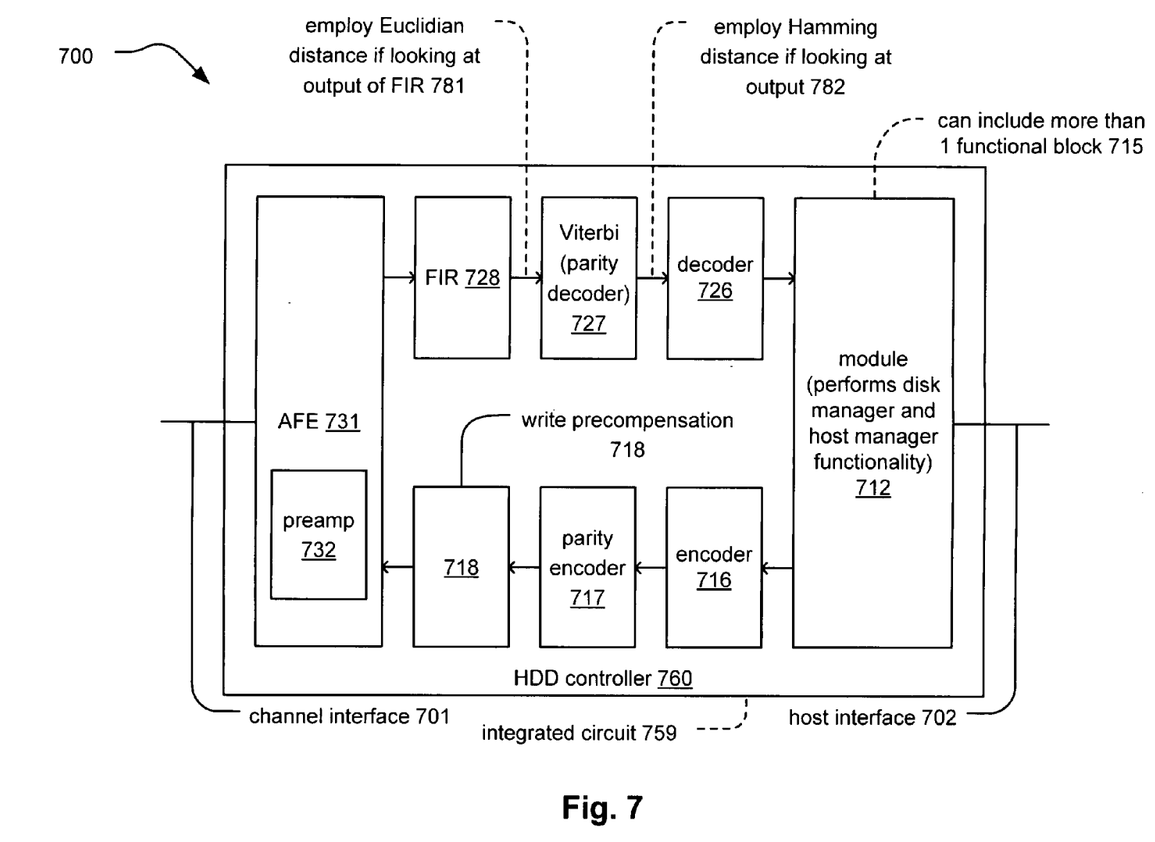
FIG. 7 illustrates an embodiment of an apparatus that includes an HDD controller.

FIG. 7 illustrates an embodiment of an apparatus 700 that includes an HDD controller 760. Referring the apparatus 700 of the FIG. 7, the apparatus 700 includes a HDD controller 760 (which can be implemented as a single integrated circuit if desired, as shown by reference numeral 759). A module 712 is operable to perform and support disk manager and host manager functionality within the HDD controller 760. It is noted that the module 712 can include one or more functional blocks, as indicated by the reference numeral 715. For example, the module 713 can be partitioned to include a host manager module and a disk manager module, if desired in certain embodiments.

A host interface 702 is controlled with the host manager functionality within module 712 and is operable to move data between the host interface 702 and various portions of the HDD controller 760. The disk manager functionality within the module 712 controls many of the various components that eventually couple to the channel interface 701 and moves data between the channel and various portions of the HDD controller 760.

The path for writing into the disk from the module 712 is shown as first passing through an encoder 716 that performs the modulation encoding. The encoded information is then provided to a parity encoder 717, whose output couples to a write precompensation module 718 that eventually couples to an analog front end (AFE) 731, that is operable to perform any of a variety of analog processing functions including digital to analog conversion, scaling (e.g., gain or attenuation), digital filtering (before converting to continuous time domain), continuous time filtering (after converting to continuous time domain), or other signal processing functions required to comport the signal into a format compatible with the channel interface 701. The AFE 731 also includes a preamp 732 that is often implemented as part of the read head assembly.

The path for reading from the disk is the converse of the write path to the disk. For example, when coming from the channel interface 701, the signal is provided initially to the AFE 731, in which the converse of many of the signal processing operations within the write process is performed. For example, an analog to digital conversion is performed, scaling, and/or filtering, among other signal processing operations.

After passing from the AFE 731 during a read process, the signal passes through a finite impulse response filter (FIR) 728, a Viterbi (parity decoder) 727 that is operable to employ the soft output Viterbi algorithm (SOVA) to determine a soft output that is indicative of the reliability of the information within the digital signal. For example, the Viterbi (parity decoder) 727 is operable to determine whether the digital signal provided to it is reliable or not. In addition, the Viterbi decoder 727 can be viewed as performing the parity decoding processing in the read path in response to the parity encoding processing (that is performed by the parity encoder 717) in the write path. This processing as performed by the Viterbi (parity decoder) 727 includes performing the detection processing that involves identifying a transition between the a preamble portion and a data portion within information that is read from a storage media of the HDD system that includes the apparatus 700.

The output from this Viterbi (parity decoder) 727 is provided to a decoder 726 that employs the same code as the encoder 716. The output from this decoder 726 is provided back to the appropriate component within the module 712.

As described above, when constructing the appropriate sync mark for the system, either the input or output of the Viterbi (parity decoder) 727 can be considered. For example, the minimum distance measurement which can be employed may be either a Euclidean distance or a Hamming distance, among other distance measurement types. When implementing a scheme to that considers the sync mark at the output of the Viterbi (parity decoder) 727, a Hamming distance measurement could be employed, as indicated with reference numeral 782. When implementing a scheme to that considers the sync mark at the input of the Viterbi (parity decoder) 727 (or the output of the FIR 728), then a Euclidean distance measurement could be employed, as indicated with reference numeral 781.

Figure 8:
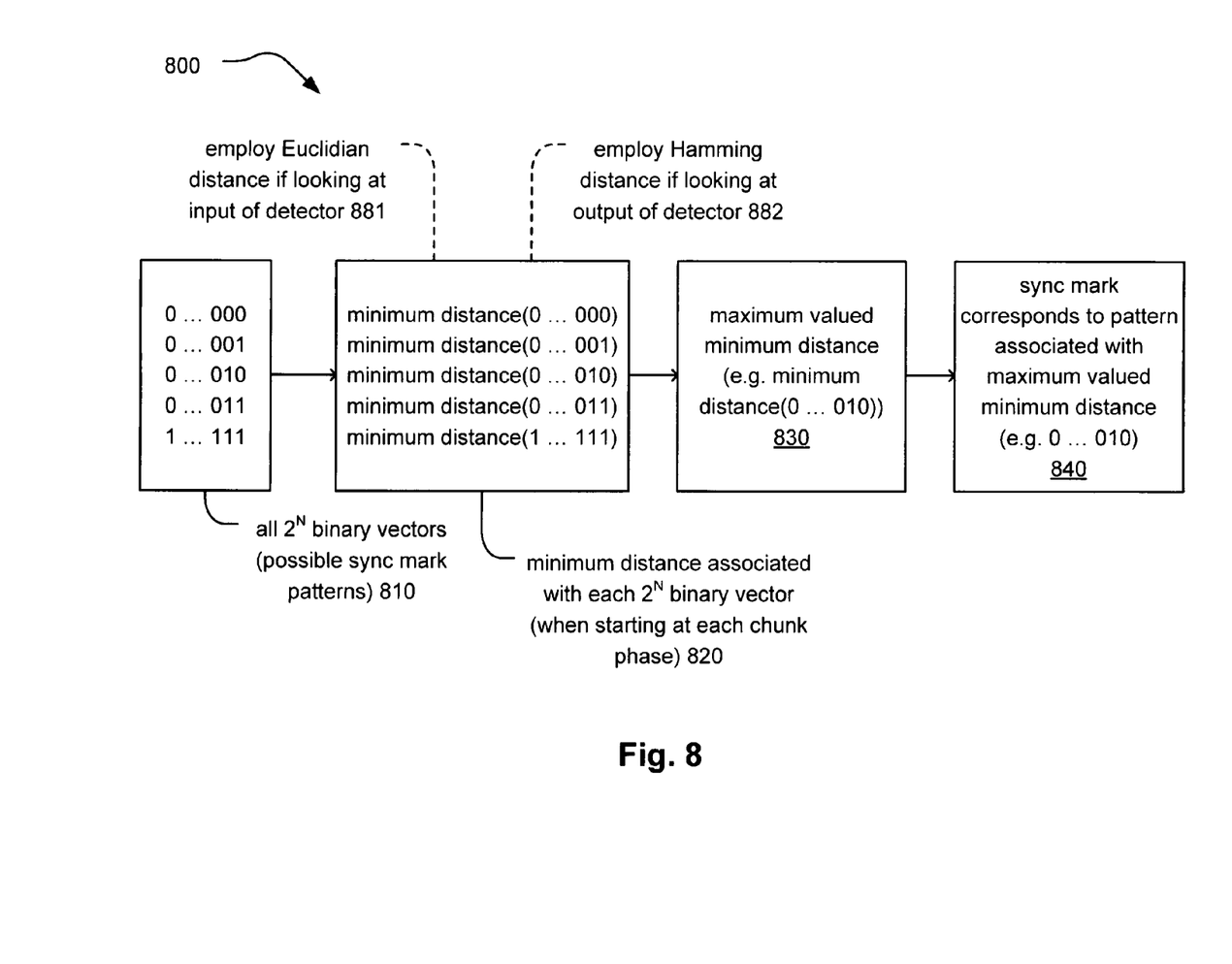
FIG. 8 illustrates an embodiment of sync mark identification.

FIG. 8 illustrates an embodiment of sync mark identification 800. As shown in a block 810, all possible binary vectors of a particular size identified as being the possible sync mark patterns. Generally speaking, the number of bits in each of the binary vectors is N, where the total number of binary vectors is then $2^N$. Also, N can be changed and even more than one value of "N" can be employed when constructing the sync mark pattern to allow an even a broader range and type through which possible sync marks can be searched.

Then, for each of the possible sync mark patterns, that sync mark is applied to the packet of information starting at each of the chunk phases within the preamble portion thereof, and continuing to the portion that is part-preamble/part-sync mark and so on. As each of these possible sync marks is applied to the packet, a minimum distance is identified that corresponds to that particular possible sync mark, as shown in a block 820. Each of these minimum distances can be indexed as follows: the minimum distance determined when the possible sync mark (0 . . . 000) is applied is identified as "minimum distance (0 . . . 000)", the minimum distance determined when the possible sync mark (0 . . . 001) is applied is identified as "minimum distance (0 . . . 001)", and so on.

As also described above with respect to other embodiments, when constructing the appropriate sync mark for the system, either the input or output of a detector can be considered, and either a Euclidean distance or a Hamming distance, among other distance measurement types, should be employed as shown by reference numerals 881 and 882, respectively.

After the minimum distance associated with each of the possible sync mark patterns has been identified, as shown in a block 820, then the maximum valued minimum distance is thereafter identified as shown in a block 830. For example, if the largest minimum distance of all of the minimum distances identified in the block 820 is the one associated with the sync mark (0 . . . 010), then that maximum valued "minimum distance(0 . . .010)" is selected and the corresponding sync mark (0 . . . 010) would then be the optimal sync mark as shown in a block 840.

Generally speaking, when searching for a sync mark pattern, the sync mark pattern length is fixed and can be denoted as L. In some embodiments, L takes a value greater than 14, and in such situations, the construction of the sync mark pattern can be focused on those with length of 16.

Another approach of searching for a sync mark is presented below:

1. For i=0, i<$2^L$−1
2. b=(i)$_2$, where (x)$_2$ stands for the binary representation of x. b is a sequence of 0's and 1's and has length L (0's can be prepended in order to ensure this length).
3. Modulate b, by mapping digital 0 to −1 and digital 1 to 1. Convolve b by the partial response (PR) target to obtain the pattern c.
4. The 2T preamble pattern is 1100, and let d be the pattern 1100 1100 1100 1100 b. Let e be the 32 symbol pattern obtained by convolving the modulated pattern corresponding to d with the PR target.
5. It is noted that the phase of the preamble is known at the receiver. Therefore, the received pattern can be compared with the sync mark pattern every 4 symbols to detect the sync mark. For the pattern b, the minimum Euclidean distance is computed from a 16 symbol pattern in e starting from the i-th symbol of e, where i is an integer multiple of 4, i≦12.
6. End
7. Select the pattern b which has the maximum of the minimum Euclidean distances as the optimal sync mark pattern.

An example using this approach is presented below:

For the PR4 target (1 0 −1), the 16 bit optimal SM pattern by computer search is 0011000110000110 with minimum Euclidean distance of 1182 whereas the 18-bit SM is 001100011000111100 with distance 1312.

The optimal SM of length 16 for the (5 5) PR target is 0011001111110000 with Euclidean distance 1400 whereas the 18-bit sync mark obtained by computed search was 001100000011111110 with distance 1550.

The 16 bit sync mark constructed for the perpendicular recording outperforms the Hamming SM of length 27 used widely in the HDD Read/Write channels. The next plot shows the failure probabilities of the designed 16 bit sync mark and the 27 bit Hamming SM as a function of the SNR.

Figure 9:
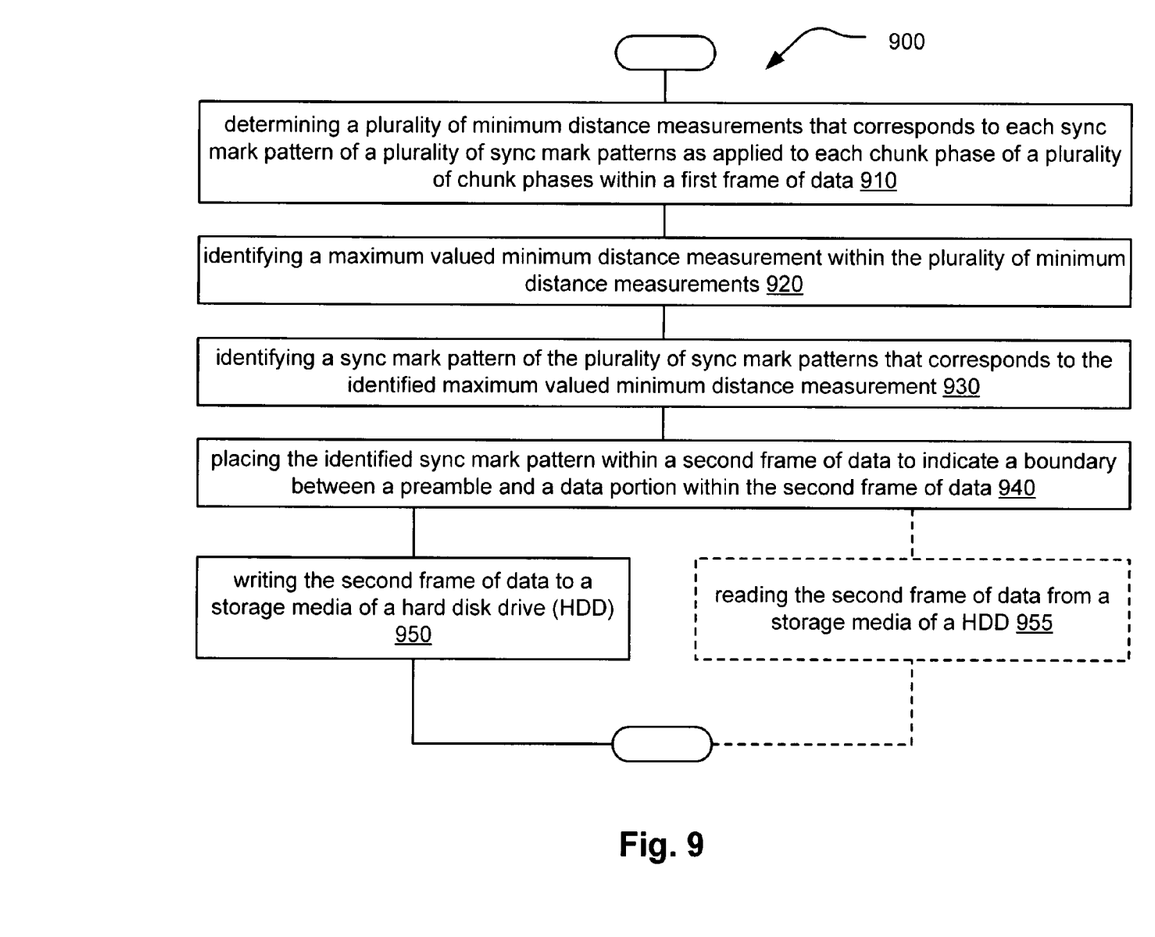
FIG. 9 illustrates an embodiment of a method that is operable to identify a sync mark.

FIG. 9 illustrates an embodiment of a method 900 that is operable to identify a sync mark. As shown in a block 910, the method 900 involves determining a plurality of minimum distance measurements that corresponds to each sync mark pattern of a plurality of sync mark patterns as applied to each chunk phase of a plurality of chunk phases within a first frame of data. As shown in a block 920, the method 900 continues by identifying a maximum valued minimum distance measurement within the plurality of minimum distance measurements.

As shown in a block 930, the method 900 continues by identifying a sync mark pattern of the plurality of sync mark patterns that corresponds to the identified maximum valued minimum distance measurement. It is noted that any of a variety of distance measurements can be employed, including Euclidean or Hamming distance measurements. As shown in a block 940, the method 900 continues by placing the identified sync mark pattern within a second frame of data to indicate a boundary between a preamble and a data portion within the second frame of data. This subsequently allows for easier detection of the transition between the preamble and data portions of a packet.

As shown in a block 950, in one embodiment, the method 900 continues by writing the second frame of data to a storage media of a hard disk drive (HDD). Alternatively, the method 900 can include transmitting the second frame of data across any of a wide variety of communication channel types.

As shown in a block 955, in an alternative embodiment, the method 900 continues by reading the second frame of data from a storage media of a HDD. Alternatively, the method 900 can include receiving the second frame of data from any of a wide variety of communication channel types.

It is noted that the various aspects presented herein can be applied across a very wide range of communication system types and not only those that correspond to HDD systems. Generally speaking, any communication system type can benefit from the various aspects presented herein. Moreover, it is noted that the various aspects presented herein can be applied across a very wide range of media storage devices, includes those that employ optical drive controllers.

It is also noted that the methods described within the preceding figures may also be performed within any appropriate system and/or apparatus designs without departing from the scope and spirit of the invention.

In view of the above detailed description of the invention and associated drawings, other modifications and variations will now become apparent. It should also be apparent that such other modifications and variations may be effected without departing from the spirit and scope of the invention.

What is claimed is:

1. An apparatus, comprising:
   a processing module; and
   a memory, coupled to the processing module, that is operable to store operational instructions that enable the processing module to:
      determine a plurality of minimum distance measurements that corresponds to each respective sync mark pattern of a plurality of sync mark patterns as applied to each chunk phase of a first preamble composed of a plurality of repeated, successive chunk phases that is followed by a duplicate of the respective sync mark pattern within a first frame of data;
      identify a maximum valued minimum distance measurement within the plurality of minimum distance measurements;

identify a sync mark pattern of the plurality of sync mark patterns that corresponds to the identified maximum valued minimum distance measurement;

place the identified sync mark pattern within a second frame of data to indicate a boundary between a second preamble and a data portion within the second frame of data; and write the second frame of data to or read the second frame of data from a storage media of a hard disk drive (HDD).

2. The apparatus of claim 1, wherein:
the second frame of data is the first frame of data.

3. The apparatus of claim 1, wherein:
each respective sync mark pattern of the plurality of sync mark patterns includes N bits, where N is an integer; and
the plurality of sync mark patterns includes all possible $2^N$ binary vectors including an all zero-valued binary vector and an all one-valued binary vector.

4. The apparatus of claim 1, wherein: the plurality of minimum distance measurements is a plurality of minimum Euclidian distance measurements.

5. The apparatus of claim 1, wherein:
the plurality of minimum distance measurements is a plurality of minimum Hamming distance measurements.

6. The apparatus of claim 1, wherein:
the first preamble includes a predetermined pattern having a first number of bits that is repeated a plurality of times therein;
each chunk phase of the plurality of chunk phases corresponds to one beginning of the predetermined pattern that is repeated within the first preamble; and
the identified sync mark pattern includes a second number of bits that is different than the first number of bits such that the identified sync mark pattern overlaps a first predetermined pattern and at least a portion of a second predetermined pattern within the first preamble.

7. The apparatus of claim 1, wherein the memory, coupled to the processing module, is operable to store operational instructions that enable the processing module to:
process the second frame of data into a format that comports with a communication channel; and
launch the processed second frame of data into the communication channel.

8. The apparatus of claim 1, the memory, coupled to the processing module, is operable to store operational instructions that enable the processing module to:
process the second frame of data into a format that comports with a read channel that is coupled to the storage media of the HDD; and
launch the processed second frame of data into the read channel.

9. The apparatus of claim 1, the memory, coupled to the processing module, is operable to store operational instructions that enable the processing module to:
read the second frame of data from the storage media of the HDD; and
identify the boundary between the second preamble and the data portion within the second frame of data.

10. An apparatus, comprising:
a processing module; and
a memory, coupled to the processing module, that is operable to store operational instructions that enable the processing module to:
determine a plurality of minimum distance measurements that corresponds to each respective sync mark pattern of a plurality of sync mark patterns as applied to each chunk phase of a plurality of repeated, successive chunk phases that is followed by a duplicate of the respective sync mark pattern within a frame of data;
identify a maximum valued minimum distance measurement within the plurality of minimum distance measurements;
identify a sync mark pattern of the plurality of sync mark patterns that corresponds to the identified maximum valued minimum distance measurement;
place the identified sync mark pattern within the frame of data to indicate a boundary between a first preamble and a data portion within the frame of data;
process the frame of data into a format that comports with a communication channel; and
launch the processed frame of data into the communication channel; and wherein:
each sync mark pattern of the plurality of sync mark patterns includes N bits, where N is an integer; and
the plurality of sync mark patterns includes all possible $2^N$ binary vectors including an all zero-valued binary vector and an all one-valued binary vector.

11. The apparatus of claim 10, wherein:
the plurality of minimum distance measurements is either a plurality of minimum Euclidian distance measurements or a plurality of minimum Hamming distance measurements.

12. A method, comprising:
determining a plurality of minimum distance measurements that corresponds to each respective sync mark pattern of a plurality of sync mark patterns as applied to each chunk phase of a plurality of repeated, successive chunk phases that is followed by a duplicate of the respective sync mark pattern within a first frame of data;
identifying a maximum valued minimum distance measurement within the plurality of minimum distance measurements;
identifying a sync mark pattern of the plurality of sync mark patterns that corresponds to the identified maximum valued minimum distance measurement;
placing the identified sync mark pattern within a second frame of data to indicate a boundary between a second preamble and a data portion within the second frame of data; and
writing the second frame of data to or reading the second frame of data from a storage media of a hard disk drive (HDD).

13. The method of claim 12, wherein:
the second frame of data is the first frame of data.

14. The method of claim 12, wherein:
each respective sync mark pattern of the plurality of sync mark patterns includes N bits, where N is an integer; and
the plurality of sync mark patterns includes all possible $2^N$ binary vectors including an all zero-valued binary vector and an all one-valued binary vector.

15. The method of claim 12, wherein:
the plurality of minimum distance measurements is a plurality of minimum Euclidian distance measurements.

16. The method of claim 12, wherein:
the plurality of minimum distance measurements is a plurality of minimum Hamming distance measurements.

17. The method of claim 12, wherein:
the first preamble includes a predetermined pattern having a first number of bits that is repeated a plurality of times therein;
each chunk phase of the plurality of chunk phases corresponds to one beginning of the predetermined pattern that is repeated within the first preamble; and
the identified sync mark pattern includes a second number of bits that is different than the first number of bits such that the identified sync mark pattern overlaps a first predetermined pattern and at least a portion of a second predetermined pattern within the first preamble.

18. The method of claim 12, further comprising:
processing the second frame of data into a format that comports with a communication channel; and
launching the processed second frame of data into the communication channel.

19. The method of claim 12, further comprising:
processing the second frame of data into a format that comports with a read channel that is coupled to the storage media of the HDD; and launching the processed second frame of data into the read channel.

20. The method of claim 12, further comprising:
reading the second frame of data from the storage media of the HDD; and
identifying the boundary between the second preamble and the data portion within the second frame of data.

* * * * *